(12) United States Patent
Moran et al.

(10) Patent No.: US 6,216,148 B1
(45) Date of Patent: Apr. 10, 2001

(54) ADAPTIVE ANALOG EQUALIZER FOR PARTIAL RESPONSE CHANNELS

(75) Inventors: Patrick J. Moran, Shrewsbury, MA (US); Ivan Tin-Yam Chan, Kanata (CA); Ke Han, Davis, CA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/191,249

(22) Filed: Nov. 12, 1998

(51) Int. Cl.$^7$ .............................. G06G 7/02; G06F 17/10

(52) U.S. Cl. ................................ 708/819; 708/322; 708/3

(58) Field of Search ...................... 708/819, 3, 322–323, 708/320; 375/232–233; 360/65

(56) References Cited

U.S. PATENT DOCUMENTS

| | | | |
|---|---|---|---|
| 5,258,933 | * 11/1993 | Johnson et al. | 708/3 |
| 5,341,249 | 8/1994 | Abbott et al. | 360/46 |
| 5,650,954 | * 7/1997 | Minuhin | 708/819 |
| 5,677,951 | 10/1997 | Gay | 379/406 |
| 5,682,125 | 10/1997 | Minuhin et al. | 333/18 |
| 5,734,680 | 3/1998 | Moore et al. | 375/263 |
| 6,078,614 | * 6/2000 | Brown et al. | 375/232 |

OTHER PUBLICATIONS

A. Shoval, D.A. Johns, W.M. Snelgrove, "Median–based Offset Cancellation Circuit Technique", IEEE International Symposium on Circuits and Systems, pp. 2033–2036, San Diego, May 1992.

Kozma, Johns, Sedra, "An Adaptive Tuning Circuit for Integrated Continuous–Time Filters" Proc. IREEE Int. Symposium on Circuits and Systems, pp. 1163–1166, May 1990.

Johns, Snelgrove, Sedra, "Performance Improvements for Fine–Tuned Adaptive Recursive Filters", IEEE Int. Synp. Circuits and Systems, pp. 1951–1954 May 1990.

Johns, Snelgrove, Sedra, "Nonideal Effects in Continuous–Time Adaptive Recursive Filters", Proc. of the $32^{nd}$ Midwest Symp. on Circuits and Systems, vol. 1, pp. 594–597, Aug. 1989.

Johns, Snelgrove, Sedra, "DC Offsets in Analogue Adaptive IR Filters", European Conference on Circuit Theory and Design, pp. 1377–141 Brighton, UK, Sep. 1989.

Kozma, Johns, Sedra "Automatic Tuning of Continuous–Time Integrated Filters Using an Adaptive Filter Technique", IEEE Trans. on Cir. and Sys., vol. 38, No. 11, pp. 1241–1248, Nov. 1991.

Johns, Snelgrove, Sedra, "Adaptive Recursive State–Spaced Filters Using a Gradient–Based Algorithm", IEEE Trans. on Cir. and Sys., vol. 37, No. 6, pp. 673–684, Jun. 1990.

Johns, Snelgrove, Sedra, "Continuous–Time LMS Adaptive Recursive Filters", IEEE Trans. on Cir. and Sys., vol. 38, No. 7, pp. 769–778, Jul. 1991.

Johns, Snelgrove, Sedra, "Orthogonal Ladder Filters", IEEE Trans. on Cir. and Sys., vol. 36, No. 3, pp. 337–343, Mar. 1989.

(List continued on next page.)

*Primary Examiner*—Tan V. Mai
(74) *Attorney, Agent, or Firm*—David B. Harrison

(57) ABSTRACT

A single analog filter structure within a partial response channel combines an antialias low pass filter and a time domain waveform shaping equalizer upstream of a digital sampler. The filter also improves latencies associated with timing acquisition of a sampler clock generator loop by removing the latency of a separate equalization filter. The filter also provides a method for adapting a combination of internal filter state voltages and currents in real time for optimizing pole locations of the analog filter structure, during both data and timing recovery operations of the channel.

20 Claims, 6 Drawing Sheets

OTHER PUBLICATIONS

Snelgrove, Shoval, "A Balanced 0.9 µm CMOS Transconductance-C Filter Tunable Over the VHF Range", IEEE Journal of Solid State Cir., vol. 27, No. 3, pp. 314–323, Mar. 1992.

Kwan, Martin, "An Adaptive Analog Continuous-Time CMOS Biquadratic Filter", IEEE Journal of Solid–State Circuits, vol. 26, No. 6, pp 859–867 Jun. 1991.

Martin, "The Isolation of Undistorted Sinusoids in Real Time", IEEE Transactions in Acousti Speech and Signal Processing, vol. 38, No. 2, pp 360–364, Feb. 1990.

Johnson, Larimore, Comments on and Additions to "An Adaptive Recursive LMS Filter", Proceedings of the IEEE, vol. 65, No. 9, pp 1399–1401.

Tan, Schaumann "Simulating General Parameter LC–Ladder Filters for Monolithic Realizations with only Transconductance Elements and Grounded Capacitors", IEEE Trans. on Ciruits and Systems., vol. 36, No. 2, pp. 299–307, Feb. 1989.

Veirman, Yamasaki, Design of a Bipolar 10–MHz Programmable Continuous–Time 0.05 Equiripple Linear Phase Filter , IEEE Journal of Solid–State Circuits, vol. 27, No. 3, pp 324–331 Mar. 1992.

Johns, "Analog and Digital State Space Adaptive HR Filters", University of Toronto, Mar. 1989 (thesis).

* cited by examiner

ADAPTIVE ANALOG EQUALIZER FOR PARTIAL RESPONSE CHANNELS

FIELD OF THE INVENTION

This invention relates generally to adaptive analog filters. More particularly, the present invention relates to an adaptive analog equalizer for partial response channels which eliminates a need for a second finite impulse response filter while providing real time adaptation to channel variations.

BACKGROUND OF THE INVENTION

The present invention provides a single digital-controlled, adaptive analog filter structure for solving a problem of providing adequate low pass filtering of an analog signal waveform, such as one read back from a magnetic digital recording medium, without phase shift while simultaneously providing equalization of the partial response channel to a desired target spectrum (impulse response). In general, prior art solutions to the problem of low pass filtering and channel equalization have been to implement a separate low pass filter (LPF) followed by a separate channel equalizer. The LPF has been implemented with e.g. one or two programmable zeros. For example, these zeros may be programmed in a disk drive partial response channel by way of a firmware optimization algorithm. The mean squared error of the sampled values is measured in some time-averaged sense, and a two-dimensional firmware-based search algorithm is then applied to set the filter zeros via a series of register write operations. The LPF pole-zero structure is then fixed from read to read.

The second filter, such as a finite impulse response (FIR) filter, is adapted in a calibration mode with e.g. training patterns, or is adapted in real time with data, by using a least-mean-squared (LMS) algorithm to further minimize the mean error of the sampled value to a fixed target value. The example of FIG. 1 shows the second filter 30 as a digital implementation of an FIR filter. FIG. 2 shows the second filter 27 as an analog FIR structure, and also suggests a filter implementation using a tapped analog delay line. In any of these prior examples, the preliminary low pass filter typically has a set of programmable fixed zeros held in a register 26.

In accordance with a second general approach of the prior art, the partial response channel may include a low pass filter with two continuously adaptive zeros, followed by a digital or analog FIR filter which is adapted with training patterns or in real time, by an adaptation process using the LMS algorithm.

Referring now in greater detail to FIGS. 1 and 2, wherein the same reference numerals are applied to functionally similar elements, a channel is shown within a hard disk drive 10. The drive 10 includes a head-disk-assembly (HDA) 11 and a printed circuit board 13 implementing a partial response read channel. The HDA 11 includes at least one, and usually several, data storage disks 12. The disk(s) 12 is rotated by a spindle motor 14. Data is typically, although not necessarily, written onto concentric storage tracks of a storage surface of the disk 12. As recorded, a data block may include a header including a synchronization field 15 followed by a data field 17. The sync field 15 is typically recorded at a constant frequency, whereas the user data is recorded at a nominal transfer rate but having a bandwidth established by data coding conventions, etc.

A data transducer 16 includes a read element which reads magnetic flux transitions previously recorded on a magnetic coating of the disk 12 by a write element of the transducer 16. The write element and associated write channel electronics are not shown in the FIG. 1 examplary disk drive but would be included in practical hard disk drive implementations. An actuator 18 positions the transducer 16 at selected radial data locations of the disk storage surface. Minute analog flux transitions picked up by the read element are preamplified by a preamplifier 20 (located within the HDA 11 at a location physically close to the transducer to minimize extraneous noise pick up) to a level sufficient for subsequent processing by the partial response read channel. The amplified transitions are then passed into the partial response read channel implemented on the PCB 13.

The read channel typically includes a closed loop gain controlled amplifier (VGA) 22 which controllably amplifies the incoming signal to an amplitude range suitable for filtering by a low pass filter 24. A register 26 holds values for programming e.g. two zero locations of the low pass filter 24. The low pass filter 24 of this conventional channel is provided as an antialias filter to attenuate out-of-band noise while at the same time having a design goal of minimizing intersymbol interference through the programmed zero location. The amplified analog signal is then synchronously sampled by a clocked digital sampler, such as an analog-to-digital converter (A/D) 28.

A second channel equalization filter provides a second filter transfer function for adapting and fine tuning the partial response channel to a desired target spectrum (impulse response) in order to cancel small system variations. The second filter is shown as a digital FIR filter 30 following the sampler 28 in the FIG. 1 prior art example. In the FIG. 2 prior art example the second filter is shown as an analog FIR filter 27 preceding the sampler 28. In these examples of previous approaches illustrated in FIGS. 1 and 2, an error generator 32 and LMS error block 34 generate filter adaptation signals which are fed back to adjust the transfer characteristics of the digital FIR filter 30 (FIG. 1) or analog FIR filter 27 (FIG. 2).

A clock circuit 36, typically implemented as a phase locked loop (PLL) is responsive to sampling errors developed by the error generator block 32 and generates clocking signals which are used to clock the sampler 28 and the digital FIR filter 30 or sampled analog FIR filter 27.

One example of a partial response channel implementing an analog low pass filter followed by a digital adaptive FIR filter is provided by commonly assigned U.S. Pat. No. 5,341,249 to Abbott et al., entitled: "Disk Drive Using PRML Class IV Sampling Data Detection with Digital Adaptive Equalization", the disclosure thereof being incorporated herein by reference. One drawback of this prior approach is digital processing latencies within the analog filter 30 or sample analog filter 27 which delay development of timing error correction signals within the analog-to-digital timing control loop. These signal sample processing latencies increase the timing acquisition time and reduce system performance.

An example of a completely analog implementation of a partial response channel on a single chip for use in a disk drive is provided by U.S. Pat. No. 5,734,680 to Moore et al., entitled: "Analog Implementation of a Partial Response Maximum Likelihood (PRML) Read Channel", also incorporated herein by reference. This analog implementation also employs a separate low pass filter, followed by an adaptive filter realized with a bucket brigade analog delay line and an analog adaptive feed forward equalizer utilizing an LMS correction algorithm. One known difficulty with an all-analog filter implementation is handling the presence of continuous and excess mean-squared-error due to DC offsets.

An adaptive analog filter structure is disclosed in U.S. Pat. No. 5,682,125 to Minuhin et al., entitled: "Adaptive Analog Tranversal Equalizer". While providing an adaptation technique for adapting the multiplier coefficients (taps), it appears to implement a two filter approach: prefilter 14 followed by the analog transversal equalizer structure 22. The use of LMS equalization for adaptive channels for minimizing intersymbol interference is illustrated e.g. by U.S. Pat. No. 5,677,951 to Gay, entitled: Adaptive Filter and Method for Implementing Echo Cancellation". This prior patent shows LMS equalization within a voice channel and is relatively complicated in implementation.

Thus, a hitherto unsolved need has remained for a simplified, adaptive, single filter structure and topology for the dual function of low pass noise reduction, and equalization of the channel to a target spectrum within a partial response communications or signaling channel.

SUMMARY OF THE INVENTION WITH OBJECTS

One general object of the present invention is to provide a single low pass filter/time domain equalizer for a partial response signaling channel in a manner overcoming limitations and drawbacks of prior approaches.

Another object of the present invention is to reduce timing acquisition latency within a partial response signaling channel.

A fiber object of the present invention is to provide real time adaptation of a multi-stage filter performing low pass antialiasing filtering as well as time domain waveform shaping to a target spectrum within a partial response data channel.

One more object of the present invention is to provide a magnetic recording and playback channel with an improved and simplified channel analog filter structure which eliminates a need for a separate analog or digital channel equalizer.

Yet another object of the present invention is to provide a single analog low pass filter/adaptive equalizer for a partial response channel implemented as a mixed signal analog/digital integrated circuit chip, wherein the filter design minimizes required chip die area while improving dynamic performance of the channel.

One more object of the present invention is to provide a transconductance/capacitance stage for a multi-stage filter in a manner overcoming limitations and drawbacks of prior approaches.

In accordance with principles of the present invention a single analog filter structure within a partial response channel combines an antialias low pass filter and a time domain waveform shaping equalizer upstream of a digital sampler. The filter equalizer also provides a method and structure for improving latencies associated with timing acquisition of a sampler clock generator loop by removing the latency of a separate equalization filter. The single filter equalizer also provides a method for adapting a combination of internal filter state voltages and currents for optimizing pole locations of the analog filter structure.

Accordingly, in one aspect of the invention an no order analog low pass and channel response equalization filter is provided within a sampled digital partial response channel, The channel includes a clocked analog-to-digital converter, where n lies in a range between 5 and 12. The filter includes n-number of adaptable transconductance stages connected in a feedback arrangement, a pole-optimization structure for optimizing filter pole locations of the stages, and a feedback control loop for adapting filter zero location of the stages on the basis of filter gradients.

In accordance with another aspect of the present invention a single adaptive analog filter is provided in a partial response signaling channel between a voltage controlled amplifier and a clocked analog to digital converter. The channel further includes a digital data bit detector, such as a Viterbi detector, or a decision feedback equalizer detector, for detecting data bits from unfiltered digital samples put out by the clocked analog to digital converter. The adaptive analog filter further includes a plurality of analog transconductance/capacitance stages connected in tandem. At least some of the stages have feedback paths to prior stages. At least some of the stages put out gradient voltages and receive analog tap control signals generated in part from the gradient voltages for controlling stage capacitance. A digital error generator is connected to generate discrete error signals by comparing functions of detected data bits and unfiltered digital samples. A digital least mean squared error generator generates tap control values from the discrete error signals and from digital representations of the gradient voltages. A digital to analog converter for a stage converts the tap control values into the analog tap control signal applied to the particular stage.

In accordance with a further aspect of the present invention, an adaptive analog transconductance/capacitance stage is provided for a multi-stage analog filter. The stage is capable of being adapted in response to a digital stage adaptation value. The stage includes an integrating amplifier for integrating an incoming signal, a slave transconductance cell, a master transconductance cell, and a digital to analog converter. The slave cell includes a differential transistor pair having a slave field effect transistor bridging emitter electrodes. A control element of the slave field effect transistor is responsive to a stage control voltage.

The digital-to-analog converter U1 converts the digital stage adaptation value into a differential tuning current which is applied to the master transconductance cell.

The master cell includes including a differential transistor pair having emitters bridged by a master field effect transistor. A control element of the master field effect transistor is also responsive to the control voltage. A servo amplifier is also responsive to the master differential transistor pair and to the differential tuning current and generates the control voltage applied to the master and slave field effect transistor control elements. Stage output is taken from the slave cell.

These and other objects, advantages, aspects, and features of the present invention will be more fully appreciated and understood upon consideration of the following detailed description of preferred embodiments presented in conjunction with the accompanying drawings.

DETAILED DESCRIPTION OF PREFERRED EMBODIMENTS

Figure 1:
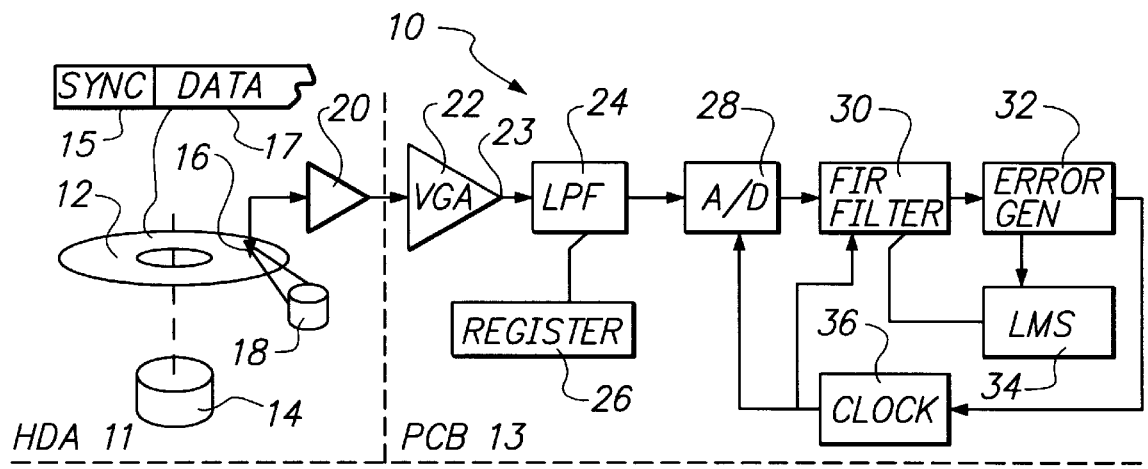
FIG. 1 is a simplified block diagram of a hard disk drive employing a conventional partial response channel including an analog programmable low pass filter, followed by a clocked digital sampler, and followed by a digital adaptive FIR filter.
Figure 2:
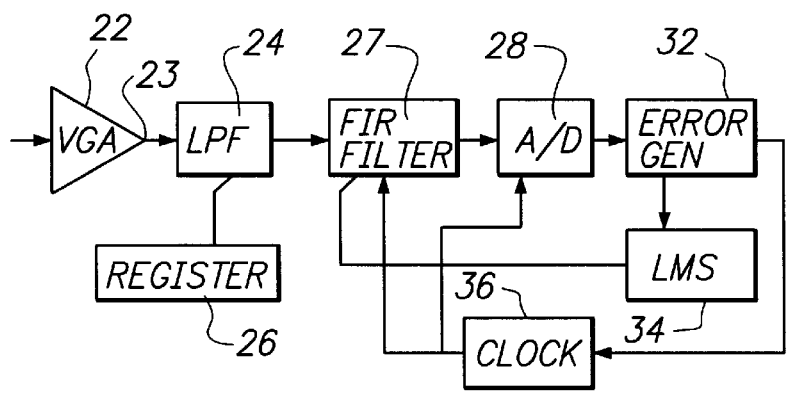
FIG. 2 is a simplified block diagram of another conventional partial response channel e.g. for a hard disk drive, having an analog programmable low pass filter, followed by an analog adaptive FIR filter, and followed by a clocked digital sampler.
Figure 3:
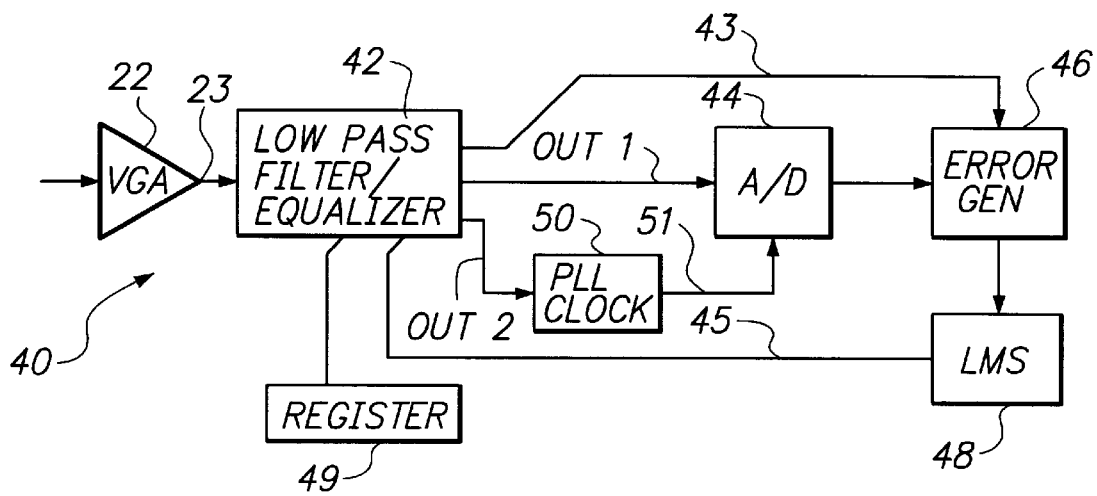
FIG. 3 is a simplified block diagram of a partial response channel having an adaptive low pass analog filter equalizer in accordance with principles of the present invention.
Figure 5:
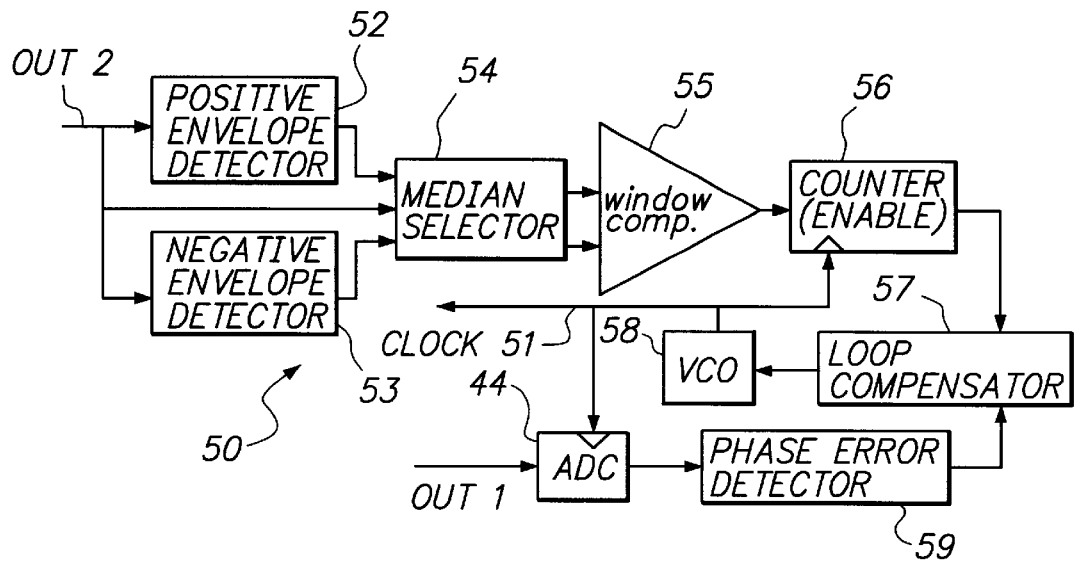
FIG. 5 is a simplified block diagram of a timing recovery circuit for generating a clock signal for use by the FIG. 3 partial response channel, also in accordance with principles of the present invention.

Turning now to FIG. 3, an adaptive analog filter in accordance with the present invention is included within e.g. a partial response channel 40, which may be a portion of a read back channel of a magnetic hard disk drive or other communications channel, such as a disk drive including the HDA 11 shown in FIG. 1. The exemplary hard disk drive includes one example of a low pass filter-equalizer 42 incorporating principles of the present invention. The exemplary filter 42 is located in a data path between the VGA 22 and a digital sampler 44. Out 1 designates a data output path for supplying an analog data signal to be sampled by the clocked sampler 44. Out 2 designates a data output path for a timing recovery circuit 50 (FIG. 5). In addition to filtered data signals on the Out 1 path and Out 2 path, a gradients path 43 provides error gradients to an error generator 46. Digital samples of data from the sampler 44 are also provided to the error generator 46. A signed error signal is developed and fed from the error generator 46 into a LMS control circuit 48. The LMS control circuit 48 generates tap control values and supplies them to the filter 42 over a taps path 45.

Figure 9:
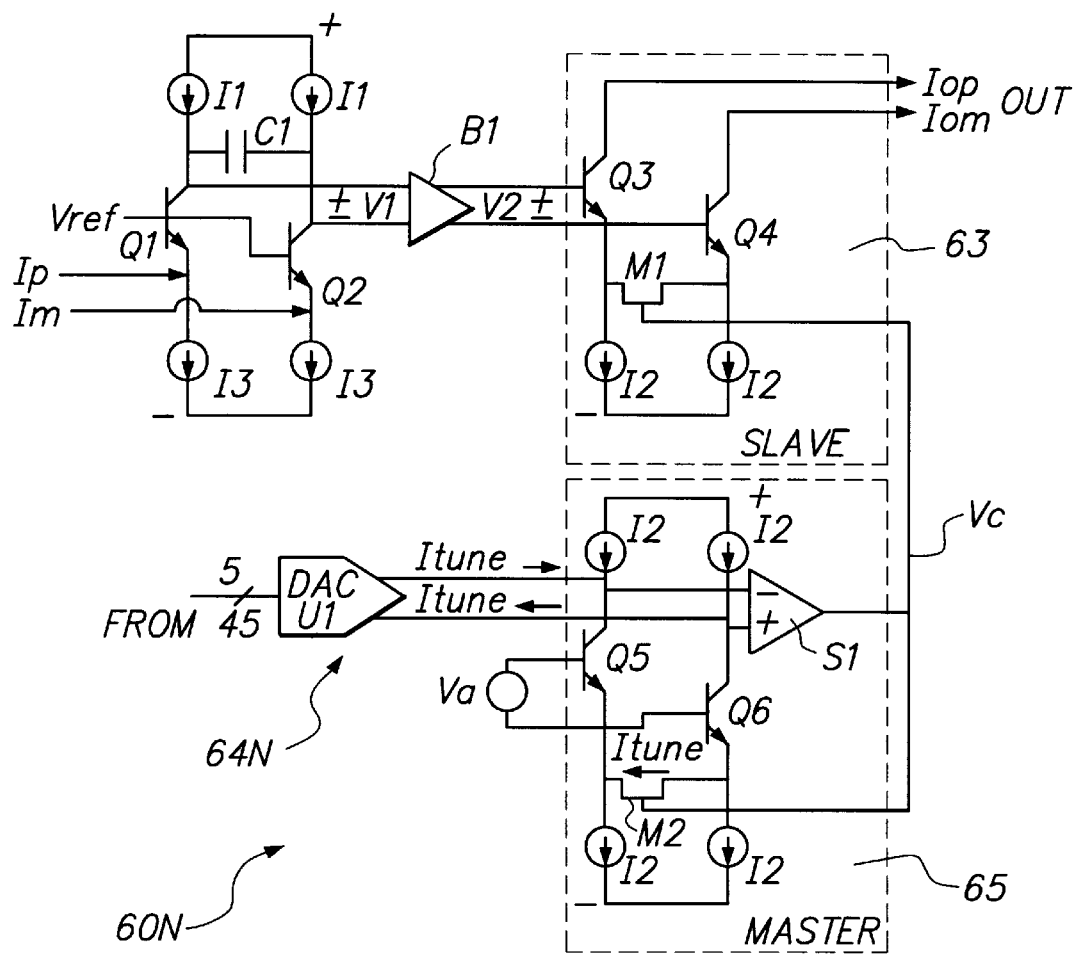
FIG. 9 is a simplified schematic circuit diagram of a zero-adaptation Gm/C integrator stage of the type employed in the FIG. 4 filter structure.

A register 49 may be provided to implement one or a few fixed tap values, rather than dynamically adapted tap values. The Register 49 is loaded under firmware control of a microcontroller of the disk drive 10 and it provides e.g. two fixed coefficients (taps). The register 49 in the present example also provides transconductance scaling values to each of the filter stages 60 found in the filter 42. FIG. 9, discussed below, presents a simplified example of each one of the e.g. seven Gm/C stages 60 found within the exemplary filter 42.

Figure 4:
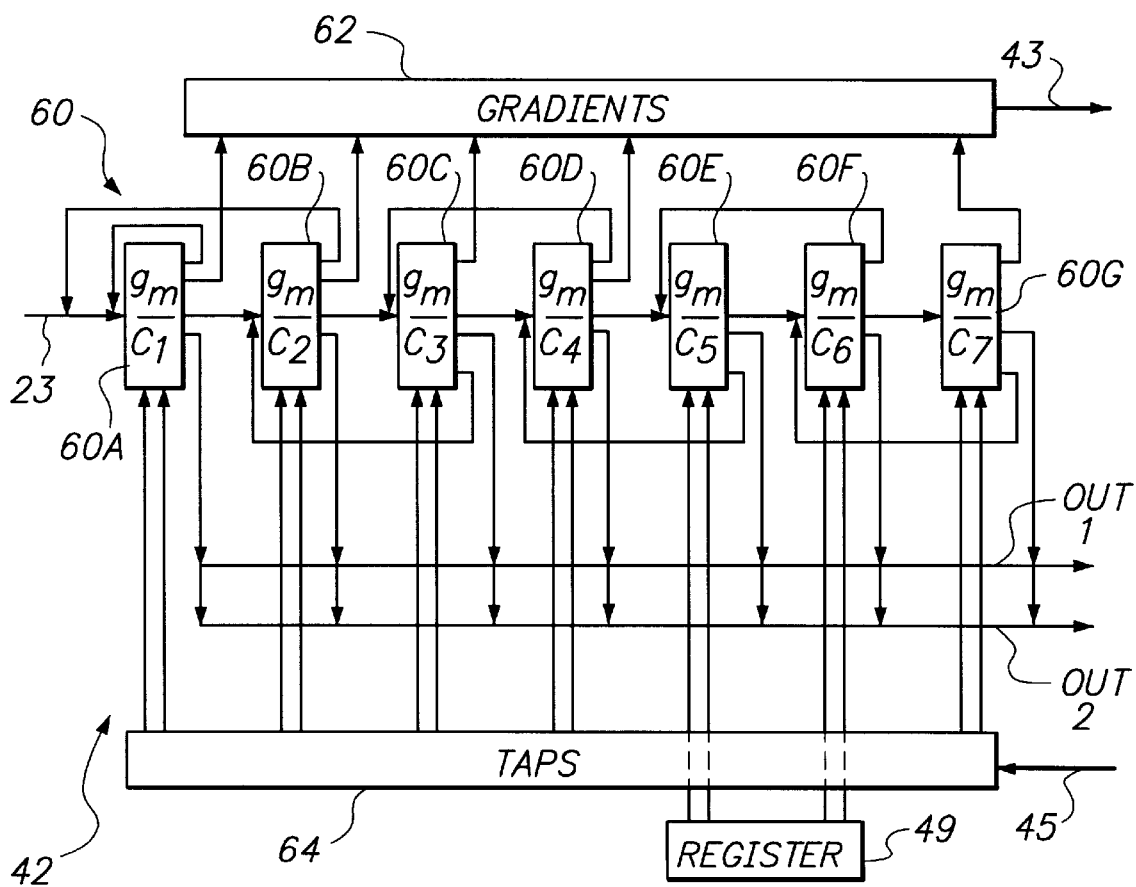
FIG. 4 is a more detailed block diagram of the adaptive low pass analog filter equalizer block shown in the FIG. 3 partial response channel.

Turning now to FIG. 4, the topology of the filter 42 is shown to be consistent with a seventh order "follow-the-leader-feedback" (FTLF) filter topology. While the present analog filter example 42 is shown as a seventh order analog filter, it will be appreciated by those skilled in the art that the order of a filter system employing principles of the present invention is not limited to a seventh-order architecture. While stage-to-stage feedback paths are shown as lines in FIG. 4, it will be appreciated that these lines denote scaled feedback branches between stages. There are e.g. seven transconductance stages 60 along an analog signal path, from an input stage 60A, through stages 60B, 60C, 60D, 60E, and 60F, and through an output stage 60G. Stage 60A has a scaled feedback path from output to input. Stage 60B has a scaled feedback path from its output fed back to the input of stage 60A. Stage 60C has a scaled feedback path from its output fed back to an input of stage 60B. Stage 60D has a scaled feedback path from its output fed back to an input of stage 60C. Stage 60E has a scaled feedback path from its output fed back to an input of stage 60D. Stage 60F has a scaled feedback path from its output fed back to an input of stage 60E. And, stage 60G has a scaled feedback path from its output fed back to an input of stage 60E.

Stages 60A, 60B, 60C, 60D, and 60G each have gradient output paths 62 which are collected together into a bus 43 entering the error generator 46. Each gradient on a path 62 is an analog voltage from a respective stage 60 which represents a direction that the accumulated error should move in order to minimize total error of the filter 42. In the present implementation, each gradient acts as a plus or minus sign value which controls the sign of an accumulated error value generated by the error generator circuit 46. Returning to FIG. 3, each gradient 62 is sampled by a round-robin sampler within the error generator 46. The sampler decides whether the gradient voltage level is positive or negative relative to a reference level, e.g. zero volts. Each gradient sample is accumulated in the LMS control block 48 in its own storage space. In the example of FIGS. 3 and 4 there are e.g. five sample registers for holding the five gradients sampled from the stages 60A, 60B, 60C, 60D and 60G. The result of accumulation of a particular gradient is fed back to the cell originating the gradient as one component providing a tap control value on the path 45 to that stage's DAC U1 (see FIG. 9). Taps enabling dynamic adaptation could be provided to the stages 60E and 60F, in which case these two stages would supply gradients over the path 43 to the error generator circuit 46 to enable dynamic adaption of these two stages.

Figure 7:
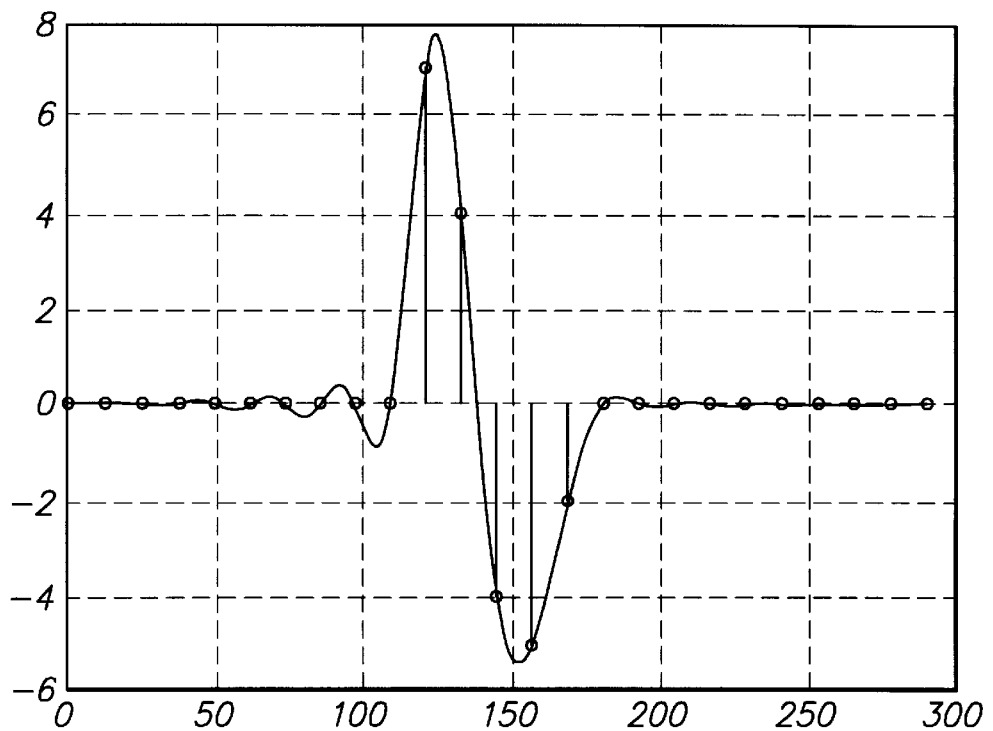
FIG. 7 is a graph in the time domain of an exemplary target impulse response for user data which is realized by using the FIG. 4 adaptive filter equalizer data and operating in the FIG. 3 channel structure.

Each one of the stages 60A, 60B, 60C, 60D and 60G of the FIG. 4 example has two tap control signal lines 64 supplied from the digital tap control bus 45. One tap control line controls filter adaptation for user data in accordance with a predetermined partial response target, such as shown in the FIG. 7 graph. Another tap control line controls filter adaptation for timing acquisition information having a particular impulse response, such as the response plotted in the FIG. 8 graph.

As mentioned, the register 49 is loaded under firmware control, and it supplies predetermined filter pole values to the stages 60A–60G in accordance with normalized pole values set forth in the following table 1 (for a 7th order filter 42):

TABLE 1

Poles (Hz)

−0.4657+/−2.4495i
−0.5705+/1.5458i
−0.628+/−0.7810i
−1.2392

The values of the system poles for a lorentzian channel which are given in Table 1 above are scaled in the actual implementation to the bit cell times required for operation using a programmable filter scaling control which is under control of register 49. In the example of analog filter 42, two fixed zeros are set at stages 60E and 60F in order to control the filter's channel gain and phase. The fixed register 49 may be replaced by adaptive taps, for example when using the timing extraction circuit 50 shown in FIG. 5. Using Out 2 of the filter 42 to recover timing does not require that the gain and phase be held. Timing recovery is described later on herein. An optimization technique is used to compute optimal settings for the fixed taps of stages 60E and 60F and the initial starting points for the adaptive taps of stages 60A–60D and 60G.

For a 16 dB signal to noise ratio and normalized density (pulse width at half amplitude divided by cell time: PW 42/T) the taps are as given in Table 2 below:

TABLE 2

| DEN-SITY | TAP 1 (60A) | TAP 2 (60B) | TAP 3 (60C) | TAP 4 (60D) | TAP 5 (60E) | TAP 6 (60F) | TAP 7 (60G) |
|---|---|---|---|---|---|---|---|
| 2.0 | −0.0114 | 0.3386 | −0.1330 | 0.1960 | −0.4959 | 1.0000 | −0.1745 |
| 2.2 | 0.0209 | 0.3331 | −0.0860 | 0.1277 | −0.4958 | 1.0000 | −0.1462 |
| 2.5 | −0.2154 | 0.3118 | 0.2014 | 0.2102 | 0.7212 | 1.0000 | 0.2682 |
| 2.8 | −0.1528 | 0.2544 | 0.2682 | 0.3581 | −0.9465 | 1.0000 | 0.2682 |
| 3.0 | −0.0440 | 0.1878 | 0.2765 | 0.3424 | −0.9917 | 1.0000 | 0.3062 |
| 3.2 | 0.3164 | −0.1396 | 0.2221 | 0.2999 | −0.9917 | 1.0000 | 0.3315 |

Figure 8:
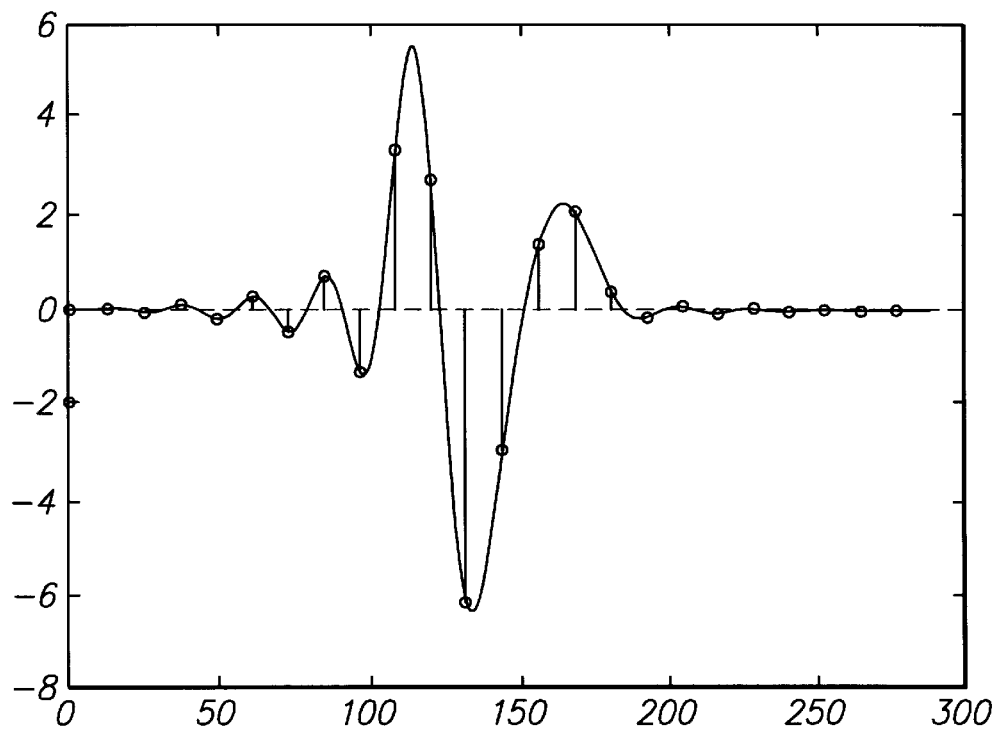
FIG. 8 is a graph in the time domain of a desired impulse response characteristic for recovering timing information from a constant frequency preamble pattern for timing recovery which is also realized by using the FIG. 4 filter operating within the FIG. 3 channel structure.

The filter structure 42 shown in FIG. 4 also supports feed forward timing recovery by providing a second output, Out 2. The band pass filter function of Out 2, shown graphed in FIG. 8, is achieved by setting the filter zeros to minimize phase noise. Out 2 from filter 42 is used to obtain the clock from the read waveform. The timing recovery circuit 50 is shown in the FIG. 5 block diagram. In FIG. 5, the unsampled read waveform on the Out 2 path from the filter 42 passes into a positive envelope detector 51 and into a negative envelope detector 53. A median detector 54 detects median values from between Out 2, and outputs of the detectors 51 and 53 to enable a window comparator 55 to extract a zero crossing in the vicinity of a local synthesizer clock. The extracted zero crossing is used to control a counter 56 which increments at the local clock rate. Each count reached by the counter 56 is supplied to a loop compensator circuit 57. The analog to digital converter 44, also clocked by the local clock, supplies digital samples to a decision-directed phase error detector 59. The phase detector 59 receives the detected data and generates a phase error signal representing a difference between expected phase and actual phase. This clock phase error is supplied to the loop compensator 57 and results in a clock phase correction signal. The clock phase correction signal is applied to control a voltage controlled oscillator (VCO) block 58. The VCO 58 generates the local clock put out over clock path 51.

The sample cell clock put out on the path 51 clocks the data sampler 44 in order to acquire digital samples of the filtered and equalized signal. The error generator 46 receives gradients over bus 43 and generates error signals which are passed to the LMS control generator circuit 48. The LMS circuit 48 provides digital tap adaptation controls which are passed via tap control bus 45 to the DAC 64 of each respective stage 60 of the filter 42 having adaptive taps, e.g stages 60A, 60B, 60C, 60D and 60G of the FIG. 4 example.

Figure 6:
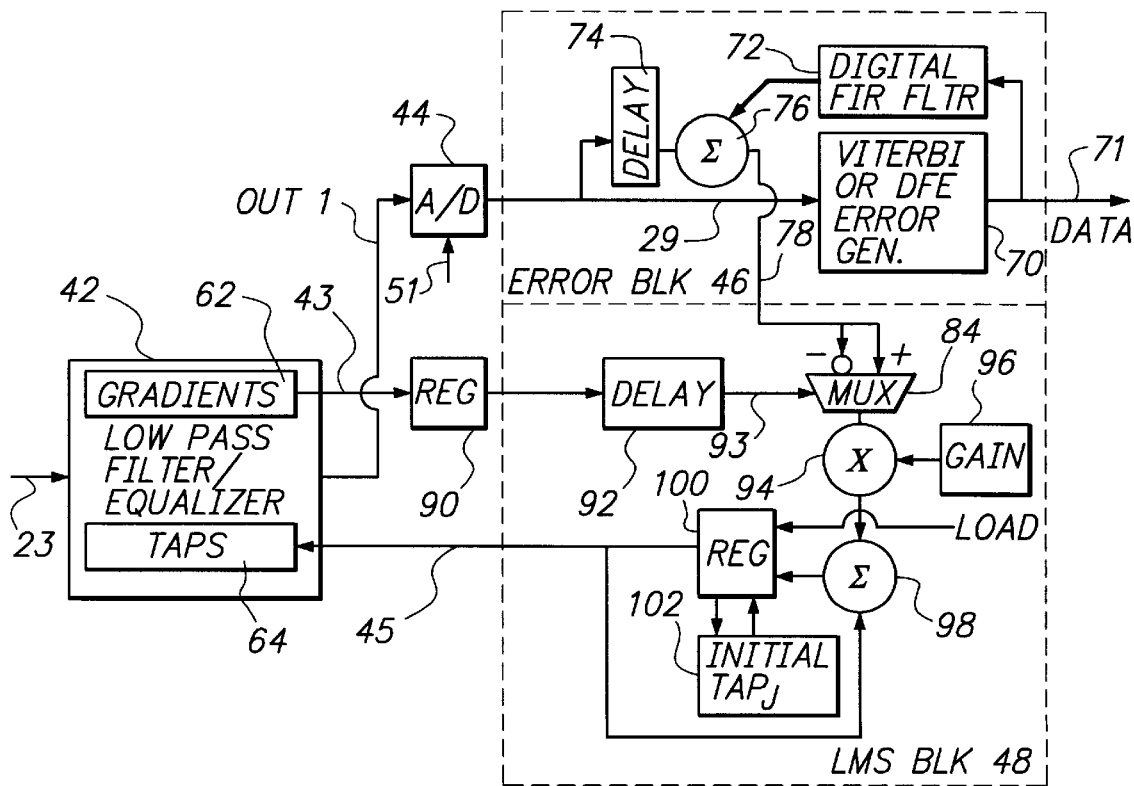
FIG. 6 is a more detailed block diagram of an error generator and an LMS tap selection control block of the FIG. 3 partial response channel.

Adaptation of the filter 42 within a partial response channel may be further understood and appreciated upon considering the more detailed FIG. 6 block diagram. In FIG. 6 the filtered data signal output of filter 42, Out 1, is applied to the A/D 44 where it is sampled at sample times controlled by a clock signal on clock path 51. A data sample output leads directly into a data bit detector 70, which may implement the Viterbi maximum likelihood detection algorithm, or which may employ decision feedback equalization (DFE) data bit detection techniques, for example. The detector 70 puts out a "most likely" representation of the actual data based on a present data sample and states along a memory path, and therefore provides a reference value which may be compared with raw quantization values in order to develop error values to control adaptation of filter 42. One branch of data bit path 71 from the detector 70 leads to further data decoding and error correction circuitry of the disk drive, not shown in FIGS. 3 and 6. Importantly, another branch of the path 71 leads to a digital FIR filter 72 which, by using table look-up techniques, assembles the binary bit states into e.g. six bit numbers. Each six bit number enters a digital summing circuit 76. At the same time, raw data quantization values from the A/D 44 are threshold detected as logical ones or zeros and are accumulated and delayed in a clocked six bit shift register 74. The delay imposed by the shift register 74 equals the processing latency through the bit detector 70 and the digital FIR filter 72. The summing circuit 76 subtracts the actual six bit values received from the A/D 44 from the reference six bit values put out by the filter 72 based on the data bit detection process in order to produce a digital error value on a path 78. The error values on path 78 are scaled (e.g. the four most significant bit positions are used) and are applied to direct and inverting inputs of a multiplexer 84 wired as a sign switch.

By way of further explanation, if a particular tap at time n, e.g. Tap j(n), is equal to Tap j(n−1) plus an error times a gradient times a gain factor, in this relation the gradient serves as a sign value. Therefore, instead of performing a multiplication, the gradient may be used to change the sign of the error signal. Accordingly, the signed gradients from filter 42 are sampled and held in a register 90. The gradients are then put through a delay matching shift register 92 and become plus/minus sign control values applied via a control path 93 to control selection of plus or minus error values at the multiplexer 84. An output from the multiplexer (error times gradient (sign)) is then applied to a multiplier 94 (implemented as a barrel shifter) which multiplies the error/gradient product by a gain factor stored in a register 96. The resultant product (error times gradient (sign) times gain) is then applied as an input to a digital summing circuit 98 which acts recursively with register 100 to form an integrator for providing a LMS control output (tap selection) on path 57 to control a particular stage 60 of the filter 42.

Initial tap weights are stored in an initial tap register 102 and are provided to the register 100 as starting values, prior to adaptation to minimize mean squared error. In this particular implementation, only the A/D 44 and the delay register 90 are clocked at the bit cell clock rate. The CMOS digital circuitry of the error generator block 46 and the LMS control block 48 is clocked at one half rate of the bit cell clock rate in order to reduce power consumption and electrical noise.

Most preferably, the analog low pass filter/adaptive equalizer 42 is formed as a portion of a mixed signal very large scale, application specific integrated circuit (ASIC) chip implementing the partial response channel 40 shown in FIG. 3 as well as the timing loop shown in FIG. 5, for example. The filter 42 has been implemented using bipolar and CMOS circuits to minimize the effects of component variations on channel performance and to keep die size to a minimum. Actual implementation of the state-space filter 42 has been accomplished using unit scaling of the state system core in order to maximize circuit matching. In the filter 42 the filter zero locations are tuned using the LMS approximation which minimizes the time-averaged error between the expected digital samples and the actual digital samples. The disclosed approach eliminates the need for an additional digital filter structure, thereby reducing IC die area and unit costs. The channel filter system 40 also eliminates any need for time-consuming firmware intervention otherwise needed to optimize a filter system zero and provide a complete set of adaptive taps. The filter structure 42 also supports a feedforward timing recovery path by including a second output having zero locations optimized to minimize phase noise and operates in a manner providing channel adaptation with minimum timing jitter.

In the FIG. 9 schematic and block circuit diagram of a representative transconductance stage 60N, an incoming signal arrives at a transistor pair Q1 and Q2 through current paths Ip and Im. A capacitor C1 integrates the incoming current, producing a voltage V1 according to the following formula:

$$V1=(Ip-Im)/(sC). \quad (1)$$

A buffer stage B1, connected to receive differential outputs comprising the voltage VI from the Q1 and Q2 pair, produces a voltage V2 which drives a slave transconductance (GM) cell 63. A differential output Iop–Iom of the slave GM cell 63 is determined by the input on a differential transistor pair Q3–Q4 and the impedance Gm1 of a CMOS device MI bridging emitter electrodes of the Q3–Q4 pair, according to the following formula:

$$(I_{op}-I_{om})=V_2 G_{m1}, \quad (2)$$

Gm1 of the device MI is controlled by a gate control voltage provided by a master GM cell 65 which is implemented using a differential transistor pair Q5–Q6 and a current-tuning digital-to-analog converter (DAC) U1. An offset voltage $V_A$ generated across the pair Q5–Q6, appears across a CMOS device M2 whose input current is set by the differential offset current that appears in matched current sources 12. A servo amplifier S1 controls the gate voltage of M2 to balance the current such that the tune current set by the DAC U1 appears across the CMOS transistor M2. The GM of element M2 is therefore controlled by the formula given as:

$$G_{m2}=I_{tune}/V_A. \quad (3)$$

Accordingly, within the matching between M1 and M2, Gm1 equals Gm2, since the control voltage Vc put out by the servo amplifier S1 is coupled between the master 65 and the slave 63. The overall small signal gain of the gmC cell 60N is thus described by the following formula:

$$(I_{op}-I_{om})=(I_p-I_m)(I_{tune}/V_A)(1/sC). \quad (4)$$

Mathematical description of formula 42

The transfer function of the filter is found by solving the state space equations, $$\dot{x}=Ax+By$$

$$y=Cx+Du$$

where us is the output to the filter and y is th output. The x's define internal states (voltages on the internal capacitors) of the filter. The states in this filter are selected to be at the output of each Gm-C state.

$$i\ H(s)=C(sI-A)^{-1}B$$

The enclosed specified pole location produce a system with the following values for A, B, and C:

$$A=\begin{bmatrix} -4.5672 & -2.9537 & 0 & 0 & 0 & 0 & 0 \\ 2.9537 & 0 & -1.753 & 0 & 0 & 0 & 0 \\ 0 & 1.753 & 0 & -1.474 & 0 & 0 & 0 \\ 0 & 0 & 1.474 & 0 & -1.3322 & 0 & 0 \\ 0 & 0 & 0 & 1.3322 & 0 & -1.0662 & 0 \\ 0 & 0 & 0 & 0 & 1.0662 & 0 & -0.9182 \\ 0 & 0 & 0 & 0 & 0 & 0.9182 & 0 \end{bmatrix}$$

$$B'=[1\ 0\ 0\ 0\ 0\ 0\ 0]$$

$$C=[tap1\ tap2\ tap3\ tap4\ tap5\ tap6\ tap7]$$

The value of tap1 through tap7 vary over density and signal to noise ratio. TVs 1–4 and 7 are adaptive while taps 5 and 6 fixed through a programmed register, although these taps can be adapted provided the secondary output (out 2) is used to extract timing information.

The components of the A matrix described above represent the feedback branches of the follow-the-leader-feedback (FTLF) topology shown in FIG. 4. Using the implementation sbown in FIG. 9 the feedback matrix is rounded to produce an integer scaling of the branches. The new system:

$$R=\begin{bmatrix} 4 & -2 & 0 & 0 & 0 & 0 & 0 \\ 2 & 0 & -1 & 0 & 0 & 0 & 0 \\ 0 & 1 & 0 & -1 & 0 & 0 & 0 \\ 0 & 0 & 1 & 0 & -1 & 0 & 0 \\ 0 & 0 & 0 & 1 & 0 & -1 & 0 \\ 0 & 0 & 0 & 0 & 1 & 0 & -1 \\ 0 & 0 & 0 & 0 & 0 & 1 & 0 \end{bmatrix}$$

The scaled gain values and the integrator capacitors, C, can be calculated by noticing the formulation:

$$R[C_i]^{-1}H=A$$

Where the matrix H is a Unitary matrix of elemental transforms and the matrix $C_i$ is a diagonal matrix of the capacitor values. Using forward substitution the values of $C_i$ and can be found $$C_i=[0.8757\ 0.5235\ 0.6216\ 0.7404\ 0.7610\ 1.1560\ 1.0261],$$

where the states of the system are have been rotated by H to have gains of $$k=[0.8758\ 0.6771\ 0.7378\ 0.8053\ 0.8164\ 1.0062\ 0.948]$$

The corresponding output weight are to scaled according to the gain factor.

Mean Squared Error Design for Adaptive Analog Low Pass Filter Output Coefficients

Figure 10:
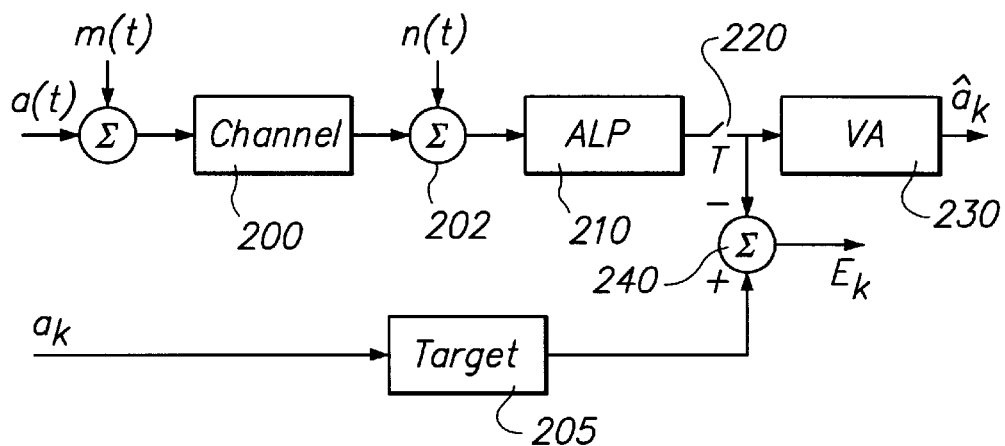
FIG. 10 is a more generalized block diagram of a channel to be equalized to a given target polynomial by an adaptive analog filter in accordance with the present invention.

Referring to the FIG. 10 block diagram, an error signal Ek is defined as the difference between the output of a noisy equalized channel 200 and a noiseless target channel 205. The channel 200 receives input data a(t) carried by a modulating signal m(t) and including an adaptive low pass filter 210, an analog-digital converter 220, and a channel detector 230 which puts out discretized estimates $a_k$ hat. Noise N(t) is shown as being injected into the channel at a node 202 upstream of the filter 210. The noiseless target channel 205 passes ideal data $a_k$ to a combining node 240 which subtracts samples taken from channel 200 from target samples of channel 205 in order to provide the error signal Ek. An optimized design for adaptive low pass filter 210 results from choosing its output coefficients such that the power of the error signal Ek is minimized. This approach is also known as minimum mean-squared-error (MMSE) design.

Figure 11:
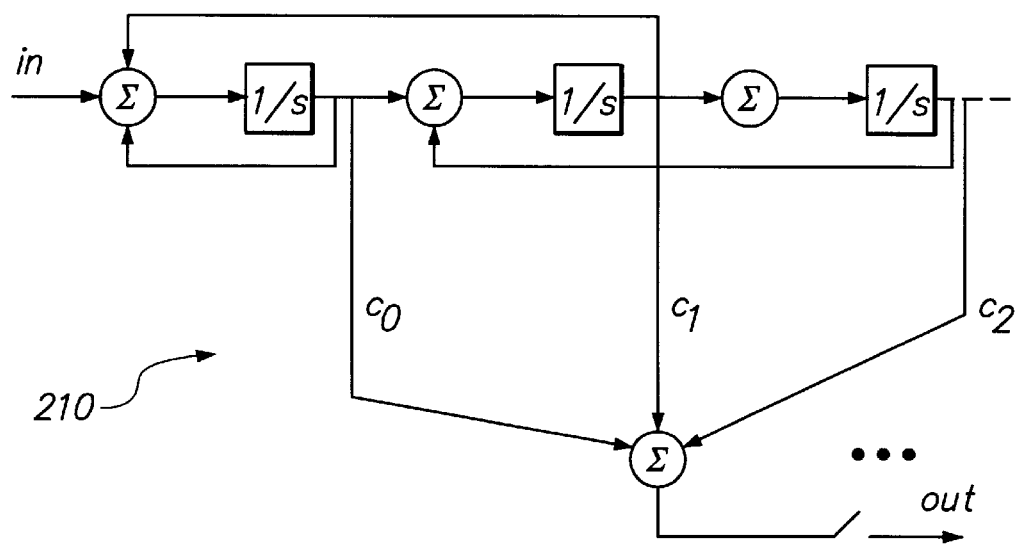
FIG. 11 is a more generalized block diagram of an adaptive analog filter in accordance with the present invention.

A generalized depiction of an adaptive low pass filter 210 in accordance with the "follow-the-leader-feedback" topology is given in FIG. 11. The feedback configuration and feedback loop gains of the FIG. 11 architecture are fixed, and the configuration and gains decide the filter pole locations. The output of the filter is the weighted output of each integrator. The weight associated with the output of each integrator is the target of the optimal design.

Figure 12:
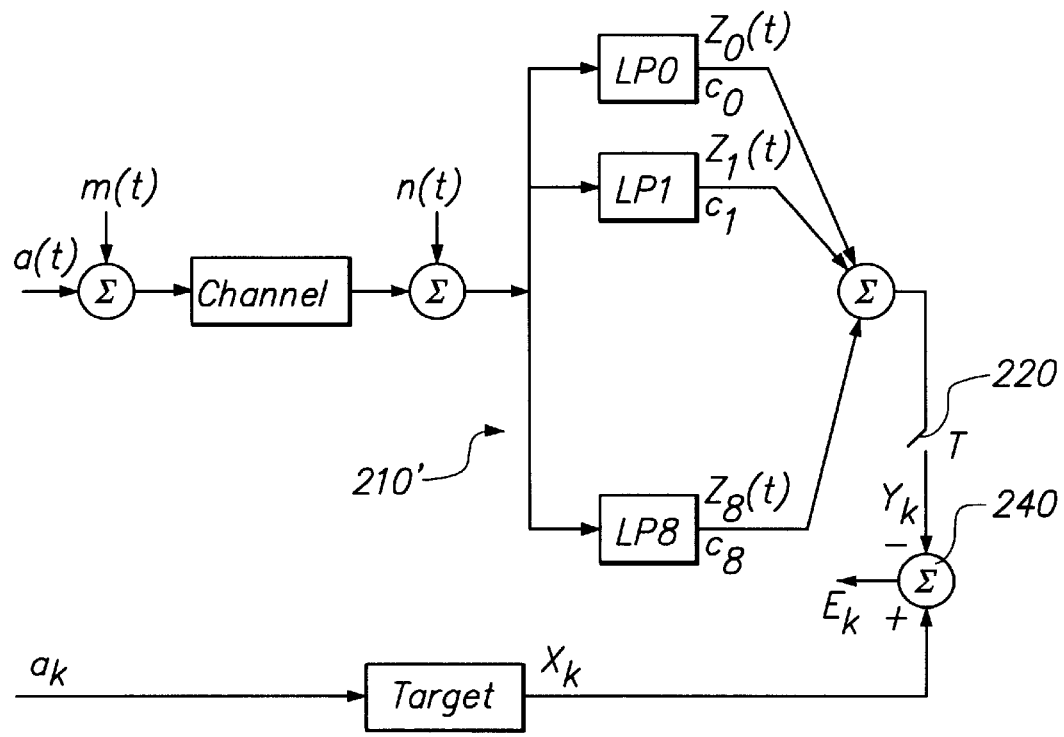
FIG. 12 is a block diagram of a filter architecture which is equivalent to the FIG. 11 adaptive analog filter.

In order to facilitate design of the output coefficients of filter 210, an equivalent block diagram of the filter system is given in FIG. 12. In the FIG. 12 filter 210', the LPi function is an equivalent transfer function of the transfer function from the input of the filter 210 to the output of the i-th integrator thereof. The sum of the weighted outputs of the integrators is sampled by the clocked sampler 220, and each sampled value is compared to the output of the target channel at combining node 240 to generate the error signal Ek.

Optimal Design:

The error signal, $E_k$, is defined as $$E_k = x_k - y_k$$

where $$x_k = \sum_{i=0}^{N} p_i a_{k-1}$$

is the output of the ideal target polynomial and $$y_k = \sum_{i=0}^{M} c_i z_i (kT + T_0)$$

is the sampled output of the equalized channel.

$z_i(t)$ is the output of the i-th integrator and can be expressed in time-domain as $$z_i(t) = a(r) * h(t) * l_i(t) + m(t) * l_i(t) + n(t) * l_i(t)$$

where a(t) is continuous-time, binary waveform at the input of the channel, m(t) is media noise modeled as white Gaussian noise at the input of the channel, h(t) is the impulse response of the channel, and $l_i(t)$ is the equivalent impulse response from the input of the ALP to the output of the i-th integrator.

Then the square of the error signal, $E_k$, can be given as $$E_k^2 = (x_k - y_k)^2 = \left( \sum_{i=0}^{N} p_i a_{k-1} - \sum_{i=0}^{M} c_i z_i(kT + T_0) \right)^2$$

$$= \sum_{i=0}^{N} \sum_{j=0}^{N} p_i p_j a_{k-i} a_{k-j} +$$

$$\sum_{i=0}^{M} \sum_{j=0}^{M} c_i c_j z_i(kT + T_0) z_j(kT + T_0) -$$

$$2 \sum_{i=0}^{N} \sum_{j=0}^{M} p_i a_{k-i} c_j z_j(kT + T_0)$$

and the mean-squared value of the error signal is given by $$E\{E_k^2\} = E\left\{ \sum_{i=0}^{N} \sum_{j=0}^{N} p_i p_j a_{k-i} a_{k-j} \right\} +$$

$$E\left\{ \sum_{i=0}^{M} \sum_{j=0}^{M} c_i c_j z_i(kT + T_0) z_j(kT + T_0) \right\} -$$

$$2E\left\{ \sum_{i=0}^{N} \sum_{j=0}^{M} p_i a_{k-i} c_j z_j(kT + T_0) \right\}$$

$$= \sum_{i=0}^{N} \sum_{j=0}^{N} p_i p_j E\{a_{k-i} a_{k-j}\} +$$

$$\sum_{i=0}^{M} \sum_{j=0}^{M} c_i c_j E\{z_i(kT + T_0) z_j(kT + T_0)\} -$$

$$2 \sum_{i=0}^{N} \sum_{j=0}^{M} p_i c_j E\{a_{k-i} z_j(kT + T_0)\}$$

Assuming all the random processes here, a(t), m(t), and n(t), are stationary, then $z_i(t)$ is also stationary. Therefore, all the autocorrelations and crosscorrelations of the random processes are just functions of the difference on time indices, not the functions of the time indices themselves, i.e., $$E\{a_{k-i} a_{k-j}\} = R_a(i-j)$$

$$E\{z_i(kT+T_0) z_j(kT+T_0)\} = R_z(i,j,0) = R_z(i,j)$$

$$E\{a_{k-i} z_j(kT+T_0)\} = R_{02}(i,j,T_0)$$

So the mean-squared value of the error signal can be rewritten as $$E\{E_k^2\} = \sum_{i=0}^{N} \sum_{j=0}^{N} p_i p_j R_a(i-j) + \sum_{i=0}^{M} \sum_{j=0}^{M} c_i c_j R_z(i,j) -$$

$$2 \sum_{i=0}^{N} \sum_{j=0}^{M} p_i c_j R_{az}(i,j,T_0)$$

$$= \bar{C}^T \Gamma \bar{C} - 2\bar{C}^T \Theta \bar{P} + \Delta = \bar{C}^T \Gamma \bar{C} - 2\bar{C}^T \Psi + \Delta$$

where $$\bar{C} = [c_0 \ c_1 \ \ldots \ c_M]^T$$

$$\bar{P} = [P_0 \ P_1 \ \ldots \ P_N]^T$$

and $$\Gamma = \begin{bmatrix} R_z(0,0) & R_z(0,1) & \cdots & R_z(0,M) \\ R_z(1,0) & R_z(1,1) & \cdots & R_z(1,M) \\ \vdots & \vdots & \ddots & \vdots \\ R_z(M,0) & R_z(M,1) & \cdots & R_z(M,M) \end{bmatrix}$$

$$\Theta = \begin{bmatrix} R_{az}(0,0) & R_{az}(0,1) & \cdots & R_{az}(0,N) \\ R_{az}(1,0) & R_{az}(1,1) & \cdots & R_{az}(1,N) \\ \vdots & \vdots & \ddots & \vdots \\ R_{az}(M,0) & R_{az}(M,1) & \cdots & R_{az}(M,N) \end{bmatrix}$$

$$\Psi = \Theta \bar{P}$$

$$\Delta = \sum_{i=0}^{N} \sum_{j=0}^{N} p_i p_j R_a(i-j)$$

To minimized the mean-squared value of the error signal, we make the derivative of the mean-squared error with respect to the coefficient vector, $\bar{C}$, and force the derivative to be zero, i.e..

$$\frac{\partial E\{E_k^2\}}{\partial \bar{C}} = 2\Gamma \bar{C} - 2\Psi = 0.$$

Thus the optimal output coefficients are given by $$\bar{C}_{opt} = \Gamma^{-1} \Psi$$

Optimal Design with Constrained Tap Weights

In the case where some of the tap weights are fixed at certain values, the optimization can be carried out using the Lagrange multipliers as shown below.

$$E\{E_k^2\} = \bar{C}^T \Gamma \bar{C} - 2\bar{C}^T \Theta \bar{P} + \Delta + \lambda_i(c_i - C_i) + \lambda_j(c_j - C_j)$$

where $\lambda_i$ and $\lambda_j$ are the Lagrange multipliers, and $C_i$ and $C_j$ are the fixed values of tap weights $c_i$ and $c_j$. Here it is assumed that only two taps are fixed. But the following derivation can be easily generalized to include any number of fixed taps.

Again, taking the derivative of the mean-squared error with respect to the coefficient vector, $\bar{C}$, and the Lagrange multipliers, $\lambda_i$ and $\lambda_j$, and force the derivative to be zero, we have $$\frac{\partial E\{E_k^2\}}{\partial \bar{C}} = 2\Gamma \bar{C} - 2\Theta \bar{P} + \begin{bmatrix} 0 \\ \lambda_i \\ \vdots \\ 0 \end{bmatrix} + \begin{bmatrix} 0 \\ \vdots \\ \lambda_j \\ 0 \end{bmatrix} = 0$$

$$C_i - C_i = 0$$

$$c_j - C_j = 0$$

The above three equations can be rewritten into a more compact form $$\begin{bmatrix} & & 0 & 0 \\ \Gamma & & 1_i & 0 \\ & & 0 & 1_j \\ 0 & 1_i & 0 & 0 & 0 \\ 0 & 0 & 1_j & 0 & 0 \end{bmatrix} \begin{bmatrix} c_0 \\ \vdots \\ c_M \\ \lambda_i \\ \lambda_j \end{bmatrix} = \begin{bmatrix} \psi_0 \\ \vdots \\ \psi_M \\ C_i \\ C_j \end{bmatrix}.$$

Therefore, $$\begin{bmatrix} c_0 \\ \vdots \\ c_M \\ \lambda_i \\ \lambda_j \end{bmatrix}_{opt} = \begin{bmatrix} & & 0 & 0 \\ \Gamma & & 1_i & 0 \\ & & 0 & 1_j \\ 0 & 1_i & 0 & 0 & 0 \\ 0 & 0 & 1_j & 0 & 0 \end{bmatrix}^{-1} \begin{bmatrix} \psi_0 \\ \vdots \\ \psi_M \\ C_i \\ C_j \end{bmatrix}.$$

Calculating the Correlation Matrices $$(R_z(i,j) = R_z(i,j,0) = E\{z_i(t)z_j(t+\tau)\}|)_{\substack{t=kT+T_0 \\ \tau=0}}$$

$$= E\{(a(t) * h(t) * l_i(t) + m(t) * h(t) * l_i(t) + n(t) * l_i(t)) \cdot$$

$$(a(t+\tau) * h(t) * l_j(t) + m(t+\tau) *$$

$$(h(t) * l_j(t) + n(t+\tau) * l_j(t))\}|)_{\substack{t=kT+T_0 \\ \tau=0}}$$

$$( = E\{(a(t) * hl_i(t)) \cdot (a(t+\tau) * hl_j(t))\}|_{\tau=0} +$$

$$E\{(m(t) * hl_i(t)) \cdot (m(t+\tau) * hl_j(t))\}|_{\tau=0} +$$

$$E\{(n(t) * l_i(t)) \cdot (n(t+\tau) * l_j(t))\}|_{\tau=0}$$

$$( = R_\sigma(\tau) * hl_i(\tau) * hl_j(-\tau))|_{\tau=0} +$$

$$\sigma_m^2 \cdot hl_i(\tau) * hl_j(-\tau)|_{\tau=0} +$$

$$\sigma_n^2 \cdot l_i(\tau) * l_j(-\tau)|_{\tau=0}$$

where $\sigma_m^2$ and $\sigma_n^2$ are the powers of the media noise and the electronic noise, respectively.

And $$R_a(\tau) = E\{a(t) \cdot a(t+\tau)\}$$

$$= E\left\{\sum_{i=-\infty}^{\infty} a_i p(t - iT + \theta) \sum_{j=-\infty}^{\infty} a_j p(t + \tau - jT + \theta)\right\}$$

$$= E\left\{\sum_{i=-\infty}^{\infty} a_i \delta(t - iT + \theta) \sum_{j=-\infty}^{\infty} a_j \delta(t + \tau - jT + \theta)\right\} *$$

$$p(\tau) * p(-\tau)$$

$$= \left(\sum_{i=-\infty}^{\infty} R_a(i) \delta(\tau + iT)\right) * p(\tau) * p(-\tau)$$

$$= \sum_{i=-\infty}^{\infty} R_a(i) \cdot (p(iT) * p(-iT))$$

where $\theta$ is a random phase introduced to make a(t) a stationary process and is uniformly distributed between 0 and T, and $$p(t) = \begin{cases} 1, & \text{for } 0 \leq t < T; \\ 0, & \text{otherwise.} \end{cases}$$

The calculation of the cross-correlation matrix can be performed as follows, $$R_{az}(i, j, T_0) = E\{a_{k-i} z_j(kT + T_0)\}$$

$$= E\left\{a_{k-i}\left(\sum_{l=-\infty}^{\infty} a_l p(t - lT)\right) * hl_j(t)\bigg|_{t=kT+T_0}\right\}$$

$$= E\left\{a_{-i}\left(\sum_{l=-\infty}^{\infty} a_l p(t - lT)\right) * hl_j(t)\bigg|_{t=T_0}\right\}$$

$$= \sum_{l=-\infty}^{\infty} E\{a_{-i} a_l\}(p(t - lT) * hl_j(t)\bigg|_{t=T_0})$$

$$= \sum_{l=-\infty}^{\infty} R_a(i + l) \cdot (p(t - lT) * hl_j(t)\big|_{t=T_0})$$

Although the present invention has been described in terms of the presently preferred embodiment, it should be clear to those skilled in the art that the present invention may also be utilized in conjunction with, for example, other filter and channel topologies and architectures. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An $n^{th}$ order analog low pass and channel response equalization filter within a sampled digital partial response channel including a clocked analog-to-digital converter, wherein n lies in a range between 5 and 12, the filter comprising:
   a plurality of adaptable transconductance stages connected in a feedback arrangement,
   means for establishing an optimized filter pole location of each stage, and
   feedback control loop means for adapting a filter zero location of a said stage on the basis of gradients from said stage.

2. The analog low pass and channel response equalization filter set forth in claim 1 wherein the multiple stages are interconnected into a follow-the-leader-feadback filter topology.

3. The analog low pass and channel response equalization filter set forth in claim 1 wherein the means for establishing an optimized filter pole location comprises a register for holding digital filter pole location values, and a digital-to-analog converter for converting the digital filter pole location values into analog pole control signals which are applied to control the transconductance stages.

4. The analog low pass and channel response equalization filter set forth in claim 1 wherein the means for adapting a filter zero location of each stage comprises means for deriving a least-mean-squared error approximation which minimizes time averaged error between expected sample values and actual sample values put out by the clocked analog-to-digital converter.

5. The analog low pass and channel response equalization filter set forth in claim 4 wherein the means for adapting a filter zero location generates a digital tap control value, and wherein each stage comprises at least one tap and a digital-to-analog converter for convering the digital tap control value into a tap control level applied to the tap.

6. The filter of claim 1, wherein the plurality of adaptable transconductance stages include at least one stage comprising:
   integrating amplifier means for integrating an incoming signal;
   a slave transconductance cell including:
      a differential transistor pair Q3–Q4; and
      a slave field effect transistor bridging emitter electrodes of the transistor pair Q3–Q4; a control element of the slave field effect transistor responsive to a control voltage, the slave transconductance cell providing a stage output;
   a digital-to-analog converter U1 for converting a digital stage adaptation value into a differential tuning current;
   a master transconductance cell including:
      a differential transistor pair Q5–Q6 connected to receive the differential timing current; and
      a master field effect transistor bridging emitter electrodes of the transistor pair Q5–Q6, a control element of the master field effect transistor responsive to the control voltage; and
   a servo amplifier S1 responsive to the differential tuning current for generating the control voltage.

7. An adaptive analog filter in a partial response channel including a voltage controlled amplifier and a clocked analog to digital converter, the channel further including a digital data bit detector means for detecting data bits from unfiltered digital samples put out by the clocked analog to digital converter, the adaptive analog filter further comprising:
   a plurality of analog transconductance/capacitance stages, at least some of the stages putting out gradient voltages and receiving analog tap control signals for adjusting stage capacitance,
   a digital error generator connected to generate discrete error values by comparing functions of detected data bits and unfiltered digital samples,
   a digital least mean squared error generator for generating tap control values from the discrete error values and from digital representations of the gradient voltages, and
   digital to analog converter means for converting the tap control values to the analog tap control signals.

8. The adaptive analog filter set forth in claim 7 wherein the plurality of stages are connected in tandem in a follow-the-leader filter topology, and wherein at least some of the stages have feedback paths to prior stages.

9. The adaptive analog filter set forth in claim 7 wherein the plurality of stages are connected in parallel and further comprising summing junction for summing outputs of the stages.

10. The adaptive analog filter set forth in claim 7 wherein the digital least mean squared error generator includes a gain register for holding a loop gain value, and wherein the digital least mean squared error generator generates tap control values as functions of the discrete error values, digital representations of the gradient voltages and loop gain value.

11. The adaptive analog filter set forth in claim 7 wherein during processing of a single frequency timing pattern the digital error generator generates discrete timing error signals and the digital least mean squared error generator generates timing tap control values for adapting the filter to a predetermined timing band pass spectrum during processing of the timing pattern, and further comprising sample clock generation circuitry for generating a sample clock in response to the discrete error signals.

12. The adaptive analog filter set forth in claim 11 wherein the sample clock generation circuitry comprises a timing pattern zero crossing detector for generating a timing window, and a phase locked loop responsive to the timing window and including a voltage controlled oscillator for generating the sample clock responsive to a nominal frequency and the timing window.

13. The adaptive analog filter set forth in claim 12 wherein the sample clock generation circuitry further comprises a phase error detector for detecting a timing phase errors in digital samples put out by the clocked analog to digital converter and for providing the phase errors to the phase locked loop.

14. The adaptive analog filter set forth in claim 7 wherein the partial response channel is formed as a single mixed signal analog/digital integrated circuit chip.

15. The adaptive analog filter set forth in claim 7 wherein the digital error generator comprises a digital filter connected to receive data bits from the digital data bit detector means for putting out filtered reference values, a delay matching circuit connected to the clocked analog to digital converter for matching digital processing delays through the digital data bit detector means and the digital filter and providing a delayed raw data output, and a digital combining means for combining the filtered reference values with the delayed raw data output to provide the discrete error values.

16. The adaptive analog filter set forth in claim 7 wherein the digital least mean squared error generator comprises a multiplexer having direct and inverting inputs for receiving the discrete error values and a multiplexer output, and a control input controlled by delay matched sign values derived from said gradient voltages, a multiplier connected to multiply values from the multiplexer output by gain values to produce products, and a digital integrator means for integrating the product to produce said tap control values.

17. The adaptive analog filter set forth in claim 16 wherein the digital integrator includes a digital summing circuit and integrator register, wherein the digital summing circuit sums the products with values fed back from an output of the register to produce sums held in the register.

18. The adaptive analog filter set forth in claim 16 further comprising an initial tap register connected to supply initial tap values to the integrator register.

19. The filter of claim 7, wherein the plurality of adaptable transconductance stages include at least one stage comprising:

integrating amplifier means for integrating an incoming signal;

a slave transconductance cell including:
 a differential transistor pair Q3–Q4; and
 a slave field effect transistor bridging emitter electrodes of the transistor pair Q3–Q4; a control element of the slave field effect transistor responsive to a control voltage, the slave transconductance cell providing a stage output;

a digital-to-analog converter U1 for converting a digital stage adaptation value into a differential tuning current;

a master transconductance cell including:
 a differential transistor pair Q5–Q6 connected to receive the differential timing current; and
 a master field effect transistor bridging emitter electrodes of the transistor pair Q5–Q6, a control element of the master field effect transistor responsive to the control voltage; and a servo amplifier S1 responsive to the differential tuning current for generating the control voltage.

20. The filter of claim 19, wherein the at least one stage further comprises a buffer stage B1 between the integrating amplifier means and the slave transconductance cell.

* * * * *

UNITED STATES PATENT AND TRADEMARK OFFICE
CERTIFICATE OF CORRECTION

PATENT NO. : 6,216,148 B1
DATED : April 10, 2001
INVENTOR(S) : Moran et al.

It is certified that error appears in the above-identified patent and that said Letters Patent is hereby corrected as shown below:

Column 16, claim 5,
Line 3, replace "convering" with -- converting --.

Column 16, claim 9,
Line 54, after "comprising", insert -- a --.

Column 17, claim 13,
Line 15, delete "a".

Column 18, claim 17,
Line 2, after "and", insert -- an --.

Column 18, claim 18,
Line 6, replace "16" with -- 17 --.

Signed and Sealed this

Twenty-sixth Day of March, 2002

*Attest:*

JAMES E. ROGAN
*Attesting Officer*     *Director of the United States Patent and Trademark Office*